(12) United States Patent
Deyaf (10) Patent No.: US 9,192,031 B2
(45) Date of Patent: Nov. 17, 2015

(54) RESONATING POWER TRANSFER FOR AUXILIARY VEHICLE LIGHTS

(71) Applicant: Feniex Industries, Austin, TX (US)

(72) Inventor: Hamza Deyaf, Austin, TX (US)

(73) Assignee: Feniex Industries Inc., Austin ( * ) Notice: Subject to any disclaimer, the term of this patent is extended or adjusted under 35 U.S.C. 154(b) by 31 days.

(21) Appl. No.: 14/201,836

(22) Filed: Mar. 8, 2014

(65) Prior Publication Data
US 2015/0257242 A1 Sep. 10, 2015

(51) Int. Cl.
| | |
|---|---|
| B60Q 1/14 | (2006.01) |
| H05B 37/02 | (2006.01) |
| H02J 5/00 | (2006.01) |
| H05B 33/08 | (2006.01) |
| B60Q 1/26 | (2006.01) |
| B60Q 3/00 | (2006.01) |

(52) U.S. Cl.
CPC .............. *H05B 37/0272* (2013.01); *B60Q 1/14* (2013.01); *B60Q 1/26* (2013.01); *B60Q 3/00* (2013.01); *H02J 5/005* (2013.01); *H05B 33/0809* (2013.01); *H05B 33/0845* (2013.01); *B60Q 2900/30* (2013.01)

(58) Field of Classification Search
CPC .................................. H05B 37/00; B60Q 1/14
USPC ..................... 315/77, 82, 291, 297, 307, 308; 307/9.1, 10.1, 10.8, 91, 104
See application file for complete search history.

(56) References Cited

U.S. PATENT DOCUMENTS

| | | | |
|---|---|---|---|
| 7,525,254 B2* | 4/2009 | Lys ...................... | B60Q 1/2696 307/10.8 |
| 2005/0248283 A1* | 11/2005 | Oyaski ..................... | B60Q 1/04 315/82 |
| 2012/0119576 A1* | 5/2012 | Kesler et al. .................. | 307/10.1 |
| 2012/0153733 A1* | 6/2012 | Schatz et al. .................. | 307/104 |

* cited by examiner

*Primary Examiner* — Tung X Le (57) ABSTRACT

A resonating power transfer system for wireless vehicle lights. A power source supplies a direct electric current to a transmitting power module. A resonator control board and oscillating electric circuit converts the direct electric current into an alternating electric current. A source resonator coil generates an oscillating magnetic field in response to receiving the alternating electric current. A user controller includes a wireless communication transmitter transmits a wireless data signal to a wireless communication receiver. A wireless LED light device includes a receiving resonator coil and a set of LED lights. The receiving resonator coil generates an electric current in a presence of the oscillating magnetic field. The electric current powers the set of LED lights. The wireless communication receiver receives the wireless data signal from the wireless communication transmitter. An LED controller performs a control function on the set of LED lights in response to receiving the data signal.

20 Claims, 7 Drawing Sheets

RESONATING POWER TRANSFER FOR AUXILIARY VEHICLE LIGHTS

BACKGROUND OF THE INVENTION

1. Field of the Invention

The illustrative embodiments relate generally to wireless power transfer, and more particularly, to a method, system, and apparatus for a resonating power transfer system for wireless auxiliary vehicle LED lights.

2. Background Art

An auxiliary vehicle light emitting diode (hereinafter "LED") light is a supplemental LED light or emergency warning LED light that a user may attach to an interior or exterior of a vehicle. Examples of auxiliary vehicle LED lights include, for example and without limitation, a LED dash light, a LED deck light, an emergency LED light bar, a beacon LED light, a LED hideaway light, a LED visor light, a LED mini light bar, and other add-on emergency LED warning light and supplemental vehicle LED lights.

Typically, a user must disassemble multiple parts of the vehicle in order to attach and wire the auxiliary vehicle LED light to the vehicle battery or other vehicle power source, such as a cigarette lighter. Upon completion of the installation and wiring process, the user must reassemble each of the disassembled parts of the vehicle correctly.

For example, installing auxiliary lights on a front grill of a vehicle may require removing the car bumper and drilling holes in the car frame to mount the front grill light. This is a time-consuming and labor-intensive process.

Moreover, the process of installing auxiliary vehicle LED lights frequently results in undesirable cords and wires running from the auxiliary vehicle LED light and the cigarette lighter or vehicle battery. These electrical wires are unsightly, cumbersome, and may distract the driver or passengers within the vehicle.

Thus, the process for installing auxiliary vehicle LED lights in a vehicle is a labor intensive, time-consuming, and arduous process that may result in permanent undesirable modifications to the vehicle and unsightly electrical wires within view of vehicle occupants.

BRIEF SUMMARY OF THE INVENTION

An illustrative embodiment provides a vehicle resonating power transfer system for wireless vehicle lights. A transmitting power module includes a resonator control board, an oscillating electric circuit, and a source resonator coil. A power source is connected to the transmitting power module. The power source supplies a direct electric current to the transmitting power module. The resonator control board and oscillating electric circuit converts the direct electric current into an alternating electric current. The source resonator coil generates an oscillating magnetic field in response to receiving the alternating electric current.

A user controller includes a wireless communication transmitter adapted to transmit a wireless data signal to a wireless communication receiver. A wireless light device includes a receiving resonator coil and a set of LED lights. The receiving resonator coil generates an alternating electric current in a presence of the oscillating magnetic field. The alternating electric current generated by the receiving resonator coil powers the set of LED lights. The wireless communication receiver is adapted to receive the wireless data signal from the wireless communication transmitter associated with the user controller. An LED controller performs a control function on the set of lights in response to receiving the data signal.

Another illustrative embodiment provides a vehicle resonating power transfer system for emergency vehicle lights. A set of transmitting power modules is associated with a vehicle. The set of transmitting power modules includes a first transmitting power module and a second transmitting power module. The first transmitting power module includes a first source resonator coil. The second transmitting power module includes a second source resonator coil. A power source is connected to the set of transmitting power modules. The power source supplies an electric current to each transmitting power module in the set of transmitting power modules. The first source resonator coil and the second source resonator coil in the set of transmitting power modules generates an oscillating magnetic field in response to the set of transmitting power modules receiving the electric current from the power source.

A wireless emergency vehicle light device is associated with the vehicle. The wireless emergency vehicle light device includes a set of LED lights and a receiving resonator coil. The receiving resonator coil generates an alternating electric current to power the set of LED lights within the wireless vehicle light device in response to a presence of the oscillating magnetic field.

Still another illustrative embodiment provides a method for resonating power transfer to an emergency vehicle wireless light device. In response to receiving an electric current by a transmitting power module associated with a vehicle, a source resonator coil associated with the transmitting power module generates an oscillating magnetic field. In response to a presence of the oscillating magnetic field within a range of a receiving resonator coil embedded within a wireless light device, the receiving resonator coil generates an alternating electric current to power wireless light device.

The wireless light device includes a set of LED lights. When a user controller receives a user input, the user controller transmits a data signal by a wireless communication transmitter to the wireless light device. In response to a wireless communication receiver associated with the light device receiving the data signal, an LED controller performs a control function on the set of LED lights, by an LED controller.

BRIEF DESCRIPTION OF THE SEVERAL VIEWS OF THE DRAWINGS

The novel features believed characteristic of the invention are set forth in the appended claims. The illustrative embodiments, as well as a preferred mode of use, further objectives and advantages thereof, will best be understood by reference to the following detailed description when read in conjunction with the accompanying drawings, wherein:

DETAILED DESCRIPTION OF THE INVENTION

The different illustrative embodiments recognize and take into account a number of different considerations. It is sometimes necessary or desirable to install one or more auxiliary light devices within a vehicle or on a vehicle. For example, when an automobile is converted into a police car, it may be necessary to install an emergency LED light bar on a roof of the police car, an emergency LED dash light on an interior dash of the police car, a LED visor light, an interior LED light bar, flashers on a front grill of the police car, and/or various other emergency light devices.

The different illustrative embodiments recognize and take into account that installing auxiliary light devices on a vehicle typically requires drilling one or more permanent holes into the vehicle body, disassembling multiple parts of the vehicle, installing the auxiliary light device, wiring the auxiliary light device to a vehicle power source, and then reassembling the parts of the vehicle that were disassembled during the installation process.

Likewise, the different embodiments also recognize that auxiliary light devices installed on an interior of a vehicle may also result in cumbersome and unsightly electrical cords running from the auxiliary light device to a cigarette lighter, vehicle battery, or other power source within the vehicle.

The different illustrative embodiments recognize that magnetic induction may be used to wirelessly transmit electrical energy between two coils of conductive material within very close range of each other. When an alternating electric current runs through a transmitting coil of conductive material, it generates a magnetic field. If a receiving coil of conductive material comes into contact with the magnetic field, it will generate an alternating electric current in the second coil.

The embodiments recognize that magnetic induction is an impractical method for wirelessly transferring power to an auxiliary light device located at a significant distance from the transmitting coil. Moreover, the non-conducting materials within a vehicle, such as the metal vehicle body, may interfere with and/or prevent operation of the magnetic induction.

The different illustrative embodiments also recognize that a need exists to wirelessly provide power to an auxiliary light device without drilling holes through the metal body of the vehicle or running unsightly wires throughout the interior of the vehicle to provide power to the auxiliary light device(s).

Thus, the embodiments recognize a need to install and/or power an auxiliary light device in a vehicle without disassembling one or more parts of the vehicle to accommodate electrical wiring to power the auxiliary light device. In other words, the embodiments recognize a need for a system, apparatus, and method for wirelessly transferring electrical power from a vehicle power source to an auxiliary light device on a vehicle.

Figure 1:
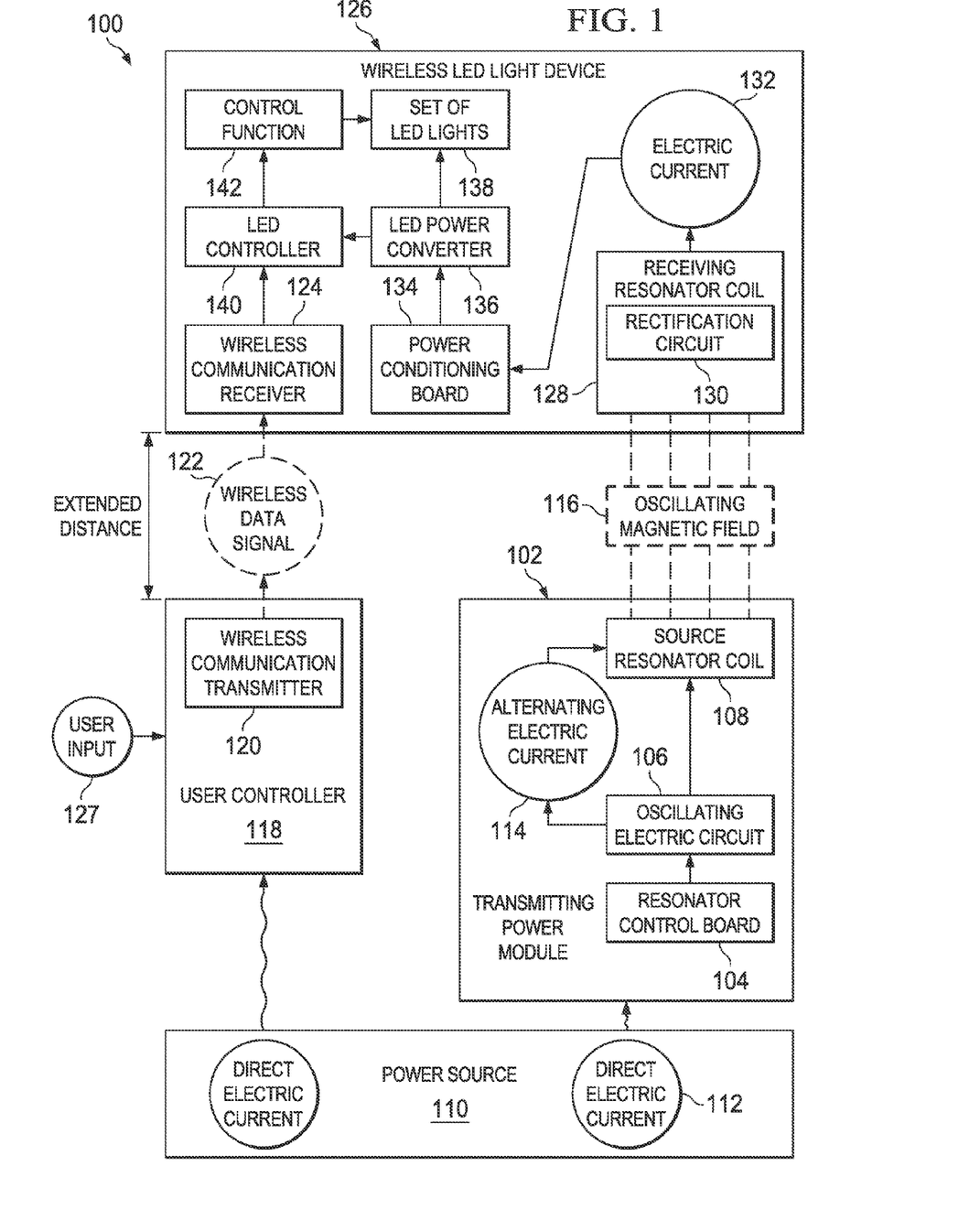
FIG. 1 is an illustration of a vehicle resonating power transfer system for a wireless auxiliary vehicle LED light device in accordance with an illustrative embodiment.

Referring now to FIG. 1, an illustration of a resonating power transfer system for a wireless auxiliary vehicle LED light device in accordance with an illustrative embodiment. A resonating power transfer system 100 is a system for wirelessly transmitting electric power to an auxiliary vehicle light device using resonant magnetic coupling.

The resonating power transfer system 100 includes a transmitting power module 102. The transmitting power module 102 includes a resonator control board 104, an oscillating electric circuit 106, and a source resonator coil 108.

A power source 110 is connected to the transmitting power module 102. The power source 110 supplies a direct electric current 112 to the transmitting power module 102.

The resonator control board 104 and the oscillating electric circuit 106 convert the direct electric current 112 into an alternating electric current 114. When the alternating electric current 114 flows through the source resonator coil 108, the source resonator coil 108 generates an oscillating magnetic field 116.

A wireless LED light device 126 is an auxiliary light device associated with a vehicle that receives electric power wirelessly via resonating power transfer. The wireless LED light device 126 may be any type of auxiliary vehicle light, such as, but without limitation, an interior LED light bar, a LED dash light, a LED deck light, a LED visor light, a license plate LED warning light, a hideaway LED light, or any other type of auxiliary vehicle light.

The wireless LED light device 126 may be located inside the vehicle or attached to an outside surface of the vehicle. For example, the wireless LED light device 126 may be located within the passenger compartment of the vehicle on a front dash of the vehicle.

The wireless LED light device 126 in this example includes a receiving resonator coil 128. The receiving resonator coil 128 is a loop or coil of conductive metal, such as, but not limited to, copper. When the receiving resonator coil 128 comes into contact with the oscillating magnetic field 116, the receiving resonator coil 128 generates an alternating electric current, such as alternating electric current 132.

The wireless LED light device 126 may optionally include a rectification circuit 130. The rectification circuit 130 is a rectifier for converting alternating current electricity into direct current electricity. In this embodiment, the rectification circuit 130 is depicted as a component within the receiving resonator coil 128. However, in another embodiment, the rectification circuit 130 may be a separate component from the receiving resonator coil 128.

A user controller 118 includes a wireless communication transmitter 120. The wireless communication transmitter 120 is a device for transmitting data wirelessly. The wireless communication transmitter 120 may be any type of device for transmission of data to a wireless auxiliary light device, such as, but without limitation, a Bluetooth® device, an infrared device, or a wireless local area network device, such as a Wi-Fi device.

In this embodiment, the wireless communication transmitter 120 transmits a wireless data signal 122 to a wireless LED light device 126 in response to receiving a user input 127. In this example, the user input 127 indicates or identifies one or more desired functions or operations associated with an auxiliary vehicle light device that has been chosen or selected by the user.

In this embodiment, the user controller 118 includes a graphical user interface, touch screen, manual push buttons, toggle switches, and/or any other type of input device enabling a user to select or enter the desired user input 127 into the user controller 118.

The wireless LED light device 126 is a wireless, auxiliary vehicle light device. The wireless LED light device 126 includes a wireless communication receiver 124, a receiving resonator coil 128, a rectification circuit 130, a power conditioning board 134, an LED power converter 136, a set of LED lights 138, and an LED controller 140.

The receiving resonator coil 128 is a loop or coil of conducting material. The receiving resonator coil 128 is resonant with the source resonator coil 108. In other words, the natural frequencies of the source resonator coil 108 and the receiving resonator coil 128 is approximately the same. The receiving resonator coil 128 generates an alternating electric current in a presence of the oscillating magnetic field 116.

The rectification circuit 130 is a rectifier. The rectification circuit 130 converts the alternating electric current on the receiving resonator coil 128 into direct electric current 132. However, in a different embodiment, the electric current 132 generated by the receiving resonator coil 128 and the rectification circuit 130 may be an alternating electric current.

The power conditioning board 134 is a device for improving the quality of the electric current 132. The wireless LED light device 126 may also optionally include an LED power converter 136. The LED power converter 136 is a device for converting power from one form to another as needed to provide the appropriate type of power to the set of LED lights 138. Thus, the rectification circuit 130, the power conditioning board 134, and/or the LED power converter modifies the frequency, voltage, and/or type of power generated by the receiving resonator coil 128 to the type and form of electric current 132 required to power the set of LED lights 138.

As used herein, the term "set" may refer to a single item, as well as two or more items. Thus, the set of LED lights 138 may include a single LED light, two LED lights, as well as three or more LED lights.

The set of LED lights 138 may include lights of a single uniform color, as well as LED lights of two or more different colors. For example, the set of LED lights may include white LED lights, red LED lights, and blue LED lights in the set of LED lights 138. In another embodiment, all the lights in set of LED lights 138 may be a uniform red color LED lights.

The wireless communication receiver 124 receives the wireless data signal 122 from the wireless communication transmitter 120. The wireless communication receiver 124 is a device for receiving wireless data from the wireless communication transmitter 120. The wireless communication receiver 124 may be any type of device for receiving a wireless data signal, such as, but without limitation, a Bluetooth® device, an infrared device, or a wireless local area network device, such as a Wi-Fi device.

The LED controller 140 performs a control function 142 on the set of LED lights 138 in response to receiving the wireless data signal 122. A control function 142 is a function that controls operation of the set of LED lights in wireless light device 128. The control function 142 may be any function of a set of LED lights 138, including, but not limited to, activating the set of LED lights 138, deactivating the set of LED lights, changing a strobe pattern of the set of LED lights 138, changing a luminosity of the set of LED lights 138, changing a frequency of flashing of one or more LED lights in the set of LED lights 138, and changing a color pattern of the set of LED lights 138.

In this embodiment, the wireless LED light device 126 includes a single set of LED lights 138. However, in another embodiment, the wireless LED light device 126 may include two or more distinct sets of LED lights. In this embodiment, for example, the control function 142 may turn off a first set of LED lights and turn on a second set of LED lights.

In this manner, the vehicle resonating power transfer system 100 permits the transmission of wireless power to a wireless LED light device 126 over an extended distance within a vehicle. Likewise, the wireless communication transmitter 120 permits the wireless transmission of data to control one or more functions of the wireless LED light device 126 without being encumbered by wires or electrical cords within the vehicle.

Figure 2:
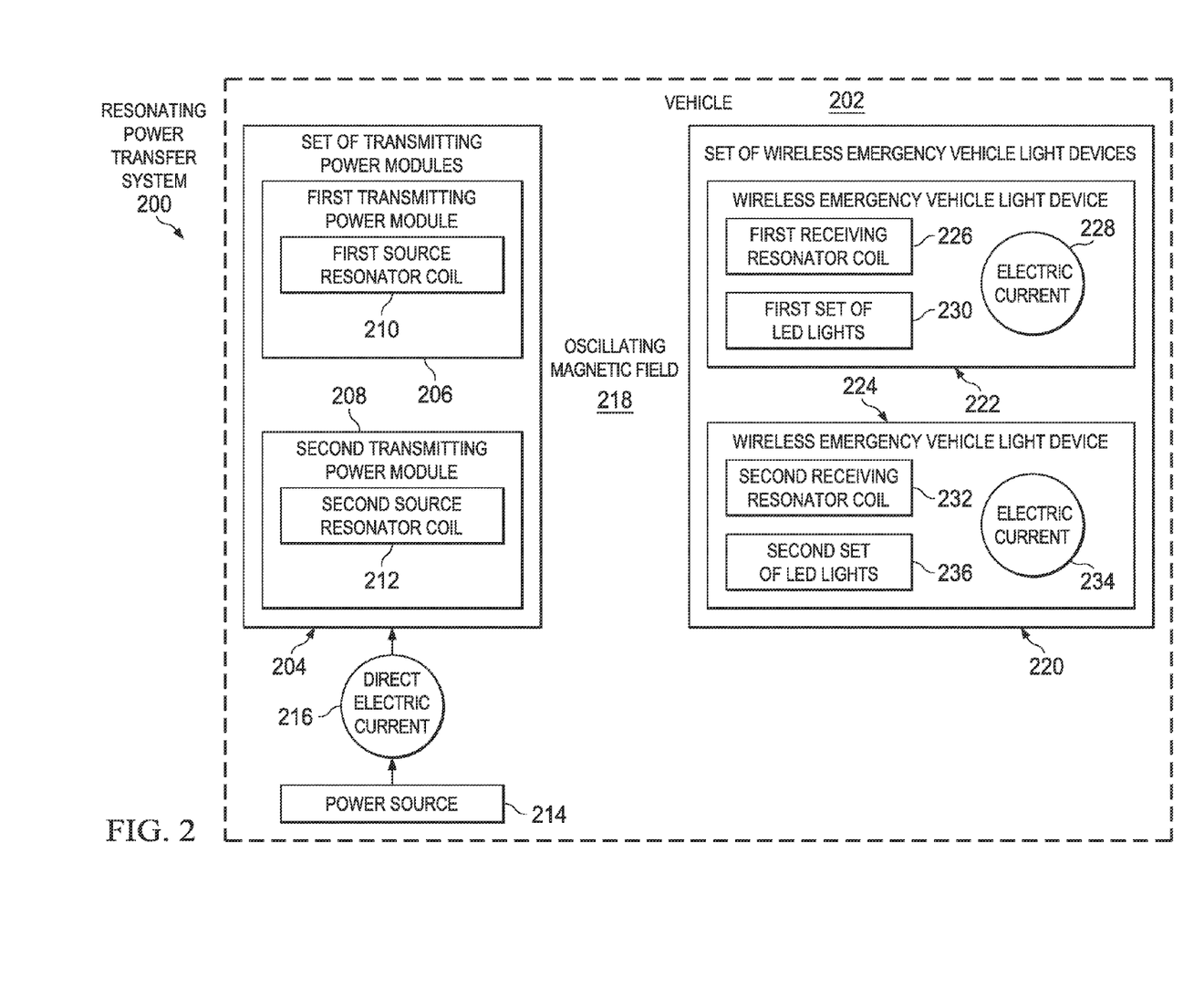
FIG. 2 is an illustration of a vehicle resonating power transfer system for wireless emergency vehicle LED lights in accordance with an illustrative embodiment.

Turning now to FIG. 2, an illustration of a resonating power transfer system for wireless emergency vehicle LED lights is shown in accordance with an illustrative embodiment. The resonating power transfer system 200 is a system for delivering wireless power to an auxiliary light device in a vehicle 202.

The vehicle 202 is an emergency vehicle. An emergency vehicle may be a law enforcement vehicle, a fire department vehicle, an emergency medical vehicle, a public utility vehicle, a tow truck, construction vehicle, or other type of emergency vehicle.

A law enforcement vehicle is a vehicle utilized by a law enforcement agency or organization, such as, but without limitation, a police car, a SWAT van, search and rescue vehicle, or any other vehicle utilized by the police department, a sheriff's department vehicle, U.S. Marshal Service vehicle, or any other law enforcement vehicle.

An emergency medical vehicle is a vehicle for transporting a sick or injured person. An emergency medical vehicle may be, for example, an ambulance.

A fire department vehicle is a vehicle utilized by a fire department. A fire department vehicle may be, for example, a fire truck.

A public utility vehicle is a vehicle used by a utility, such as the water department, an electric power utility provider, a gas utility provider, and other public works vehicles.

A tow truck is a vehicle for towing one or more other vehicles. A tow truck may also be referred to as a wrecker.

The resonating power transfer system 200 includes a set of transmitting power modules 204. The set of transmitting power modules 204 is a set of one or more transmitting power modules. Each transmitting power module in the set of transmitting power modules 204 includes at least one source resonator coil.

In this embodiment, the set of transmitting power modules 204 includes a first transmitting power module 206 and a second transmitting power module 208. However, in another embodiment, the set of transmitting power modules 204 may include three or more transmitting power modules rather than only two as shown here.

The first transmitting power module 206 includes a first source resonator coil 210. The second transmitting power module 208 includes a second source resonator coil 212. Each of the source resonator coils 210 and 212 is a coil or loop made of a conducting material. In this example, source resonator coils 210 and 212 are made of copper.

The source resonator coils 210 and 212 are resonating induction coils that generate an oscillating magnetic field 218 when the coil receives a direct electric current 216 from a power source 214. The first source resonator coil 210 and the second source resonator coil 212 may be implemented as any type of resonating induction coil, such as, but without limitation, source resonator coil 108 in FIG. 1.

The power source 214 supplying the direct electric current 216 to the set of transmitting power modules 204 may be any source of power associated with the vehicle 202. In this example, the power source 214 is a single battery. In another embodiment, the power source 214 may be a solar panel for generating an electric current using solar power, or any other source of electric power. In still another embodiment, the power source 214 may include two or more batteries. In still another embodiment, the power source 214 may include a set of batteries and a set of solar panels working in conjunction to supply the direct electric current 216.

In this embodiment, the oscillating magnetic field 218 is generated by both the first source resonator coil 210 in the first transmitting power module 206 and the second source resonator coil 212 in the second transmitting power module 208. In other words, the first source resonator coil 210 generates a first oscillating magnetic field and the second source resonator coil 212 generates a second oscillating magnetic field that combine to form the oscillating magnetic field 218 within the vehicle 202.

In another embodiment, the oscillating magnetic field 218 may be generated by a single source resonator coil in a single transmitting power module. For example, the oscillating magnetic field 218 may be generated entirely by the first source resonator coil 210 in the first transmitting power module 206 while the second source resonator coil 212 is switched off, not present, or otherwise not operational.

In yet another embodiment, the oscillating magnetic field 218 may be generated by three or more source resonator coils associated the set of transmitting power modules 204.

Figure 4:
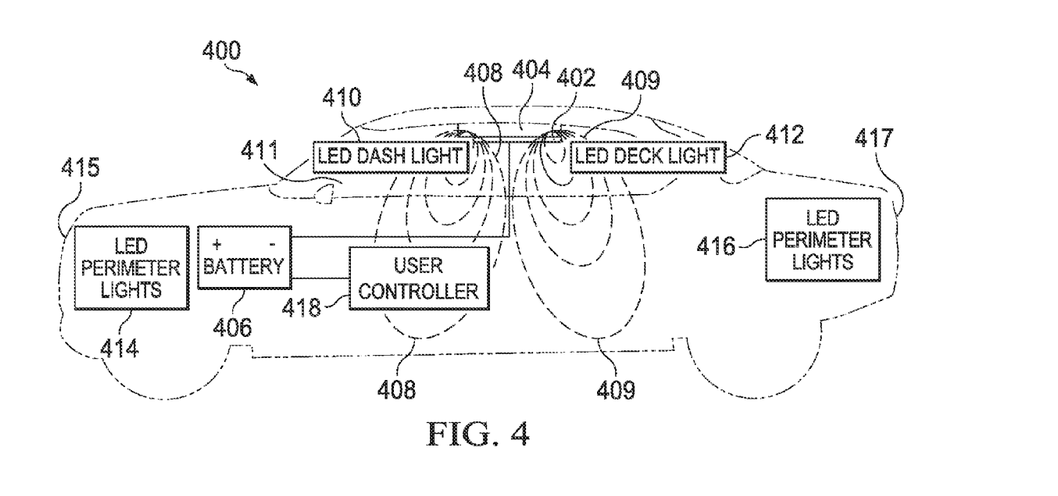
FIG. 4 is an illustration of a side view of a vehicle having a transmitting power module in accordance with an illustrative embodiment.

In this embodiment, the first transmitting power module 206 includes only one induction coil, namely the first source resonator coil 210. However, in another embodiment, the first transmitting power module 206 may include two or more source resonator coils, as shown in FIG. 4 below.

Thus, the first transmitting power module 206 may include the first source resonator coil 210 and the second source resonator coil 212 in the same transmitting power module. In this manner, the oscillating magnetic field 218 may be generated by two or more induction coils located within a single transmitting power module at a single location within the vehicle 202.

The oscillating magnetic field 218 in this embodiment is within range of a set of wireless emergency vehicle light devices 220. The set of wireless emergency vehicle light devices 220 is a set of one or more wireless emergency vehicle LED lights located within a vehicle 202. Here, the set of wireless emergency vehicle light devices 220 includes wireless emergency vehicle light device 222 and wireless emergency vehicle light device 224. However, in another embodiment, the set of wireless emergency vehicle light devices 220 may include three or more wireless emergency vehicle lights.

A wireless emergency vehicle light device is an auxiliary vehicle LED light for a vehicle 202. The wireless emergency vehicle light devices are cordless. In other words, each auxiliary vehicle light in the set of wireless emergency vehicle light devices 220 receives electrical power wirelessly without utilizing electrical cords or other insulated conductors connecting the auxiliary light device to a power source.

The first wireless emergency vehicle light device 222 includes a first receiving resonator coil 226. The first receiving resonator coil 226 is a coil or loop of conducting material having the same resonating frequency as the source resonator coils associated with the set of transmitting power modules 206, such as first source resonator coil 210 and the second source resonator coil 212. This permits resonating magnetic induction to occur when the first receiving resonator coil 226 comes into contact with the oscillating magnetic field 218 generated by the set of transmitting power modules 206.

When the first receiving resonator coil 226 comes within range of the oscillating magnetic field 218, the first receiving resonator coil 226 generates electric current 228 to power a first set of LED lights 230. The electric current 228 in this non-limiting embodiment is an alternating electric current. The first set of LED lights 230 is a set of one or more LED lights, such as, but without limitation, set of LED lights 138 in FIG. 1.

The second wireless emergency vehicle light device 214 includes a second receiving resonator coil 232. When the second receiving resonator coil 232 comes within range of the oscillating magnetic field 218, the second receiving resonator coil 232 generates electric current 234 to power a second set of LED lights 236.

Figure 3:
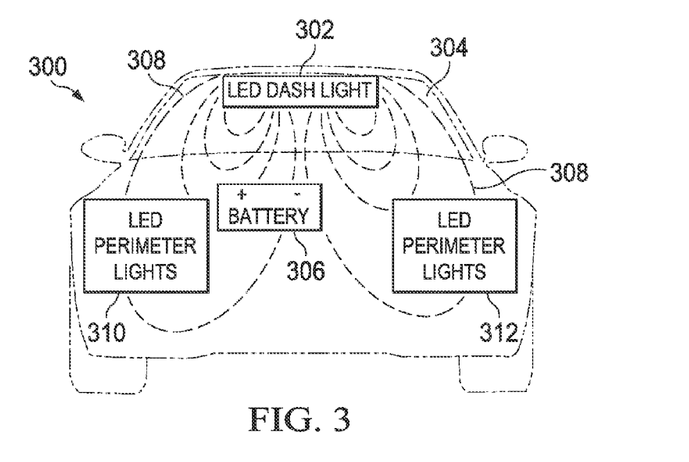
FIG. 3 is an illustration of a front view of a vehicle having a transmitting power module in accordance with an illustrative embodiment.

Referring now to FIG. 3, an illustration of a front view of a vehicle having a transmitting power module is depicted in accordance with an illustrative embodiment. Vehicle 300 is a vehicle that includes a resonating power transfer system, such as vehicle resonating power transfer system 100 in FIG. 1 or resonating power transfer system 200 in FIG. 2.

In this example, the vehicle 300 is an automobile. However, in another embodiment, the vehicle 300 may be a truck, van, ambulance, sport utility vehicle (SUV), fire truck, construction vehicle, tow truck, or any other type of vehicle.

Vehicle 300 includes a LED dash light 302 attached to an interior portion of the vehicle 300 in proximity to the windshield 304 of the vehicle 300. The light emitted by the LED dash light 302 shines through the windshield 304 to provide a warning to pedestrians and other vehicles. The LED dash light 302 is an auxiliary vehicle light device for an emergency vehicle, such as wireless LED light device 126 in FIG. 1 and wireless emergency vehicle light device 222 and 224 in FIG. 2.

A battery 306 is a power source, such as power source 110 in FIG. 1 and power source 214 in FIG. 2. The battery 306 provides electric power to one or more transmitting power modules within the vehicle 300, such as transmitting power module 102 in FIG. 1 and the set of transmitting power modules 204 in FIG. 2. The one or more transmitting power modules generates an oscillating magnetic field 308 associated with the vehicle 300.

The LED dash light 302, LED perimeter lights 310, and LED perimeter lights 312 are wireless auxiliary light device, such as wireless LED light device 126 in FIG. 1 and wireless emergency vehicle light device 222 in FIG. 2. For example, LED perimeter light 310 may be, without limitation, a grill light, a hideaway light, or any other type of auxiliary vehicle light device.

LED dash light 302, LED perimeter lights 310, and LED perimeter lights 312 each include a receiving induction coil, such as receiving resonator coil 128 in FIG. 1, first receiving resonator coil 226 in FIG. 2, and second receiving resonator coil 232 in FIG. 2.

When the LED dash light 302 contacts the oscillating magnetic field 308, the receiving induction coil within the LED dash light 302 generates an alternating electric current that powers the set of LED lights within the LED dash light 302. In this manner, the LED dash light 302 receives wireless power via resonant magnetic coupling.

Likewise, when the LED perimeter lights 310 and/or 312 contacts the oscillating magnetic field 308, the receiving induction coil within the LED perimeter lights 310 and/or 312 generates an alternating electric current that powers the LED perimeter lights 310 and/or 312.

FIG. 4 is an illustration of a side view of a vehicle having a transmitting power module in accordance with an illustrative embodiment. Vehicle 400 is a vehicle that includes a resonating power transfer system, such as vehicle resonating power transfer system 100 in FIG. 1 or resonating power transfer system 200 in FIG. 2.

The vehicle 400 includes a transmitting power module 402, such as, but not limited to, transmitting power module 102 in FIG. 2, transmitting power module 206 in FIG. 2, and/or transmitting power module 208 in FIG. 2. The transmitting power module 402 is mounted to a portion of a headliner within an interior of a passenger compartment of the vehicle 400.

However, the embodiments are not limited to mounting the transmitting power module 402 on the headliner 404 of the vehicle 400. However, the embodiments are not limited to the transmitting power module 402 being attached to a headliner 404. The transmitting power module 402 may be attached to any surface within the vehicle 400.

The transmitting power module 402 includes a set of source resonator coils. Each source resonator coil is a resonating coil, such as source resonator coil 108 in FIG. 1, first source resonator coil 210 in FIG. 2, and/or second source resonator coil 212 in FIG. 2. When the set of source resonator coils embedded in the transmitting power module 402 receives an electric current, the set of source resonator coils generates an oscillating magnetic field.

In this embodiment, the transmitting power module 402 includes a first source resonator coil at a first end of the transmitting power module 402 generating a first oscillating magnetic field 408. The transmitting power module 402 also includes a second source resonating coil embedded within a second end of the transmitting power module 402 generating a second oscillating magnetic field 409.

The set of source resonator coils generate a plurality of oscillating magnetic fields. Each oscillating magnetic field 408 and 409 has a different range or area of coverage within the vehicle 400.

A battery 406 is a power source, such as power source 110 in FIG. 1 and power source 214 in FIG. 2. The battery 406 provides electric power to the transmitting power module 402. The transmitting power module 402 generates the oscillating magnetic fields 408 and 409 when the transmitting power module 402 receives an electric current from the battery 406.

LED dash light 410, LED deck light 412, and LED perimeter lights 414 and 416 are wireless auxiliary vehicle lights, such as wireless LED light device 126 in FIG. 1 and wireless emergency vehicle light device 222 in FIG. 2. LED perimeter lights 414 and 416 may by any type of LED emergency vehicle light device, such as and without limitation, a LED grill light, a LED hideaway light, a LED license plate warning light, or any other type of auxiliary vehicle LED light device.

The LED dash light 410 is an emergency vehicle light mounted to a front dash 411 of the vehicle 400. LED deck light 412 is an emergency vehicle light mounted to a back dash within an interior of the vehicle 400.

The LED dash light 410 is within range of the first oscillating magnetic field 408. The receiving resonator coil embedded within the LED dash light 410 generates an alternating current of electricity to power the LED dash light 410 in the presence of the first oscillating magnetic field 408.

The LED deck light 412 is within range of the second oscillating magnetic field 409. The receiving resonator coil embedded within the LED deck light 412 generates an alternating current of electricity to power the LED deck light 412 in the presence of the second oscillating magnetic field 409.

The LED perimeter lights 414 in this example are attached to the vehicle on or near a front 415 of the vehicle 400. The LED perimeter lights 416 are attached to an exterior portion of the vehicle 400 at or near a rear 417 of the vehicle. In this embodiment, the LED perimeter lights 414 and 416 are not within range of the oscillating magnetic fields 408 and 409. Thus, the LED perimeter lights 414 and 416 are not receiving wireless power from transmitting power module 402 in this illustrative example.

The vehicle 400 may optionally include a user controller 418. The user controller 418 is a device for controlling one or more functions of an auxiliary light device, such as, LED dash light 410 and/or LED deck light 412. The user controller 418 may be implemented as a control device, such as user controller 118 in FIG. 1.

In this embodiment, the user controller 118 transmits a data signal to the LED dash light 410 and/or the LED deck light 412 to perform a control function, such as turning on the LED dash light 410 and/or the LED deck light 412, turning off the LED dash light 410 and/or the LED deck light 412, changing a strobe pattern of LED dash light 410 and/or the LED deck light 412, changing a luminosity of the LED dash light 410 and/or the LED deck light 412, changing a frequency of flashing of the LED dash light 410 and/or the LED deck light 412, or otherwise controlling the function of the LED dash light 410 and/or the LED deck light 412 based on user input.

Figure 5:
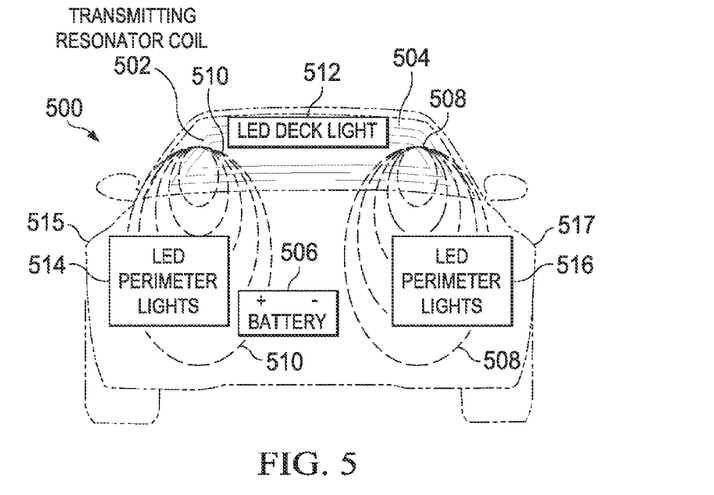
FIG. 5 is an illustration of a rear view of a vehicle having a transmitting power module embedded in a windshield in accordance with an illustrative embodiment.

Turning now to FIG. 5, an illustration of a rear view of a vehicle having a transmitting power module embedded in a windshield is shown in accordance with an illustrative embodiment. Vehicle 500 is associated with a resonating power transfer system, such as vehicle resonating power transfer system 100 in FIG. 1 or resonating power transfer system 200 in FIG. 2.

In this embodiment, a source resonator coil 502 is embedded within a windshield 504 of the vehicle 500. The source resonator coil 502 may be embedded within the windshield 504 or the source resonator coil may be attached to an outer surface of the windshield 504.

The windshield 504 is a back windshield of the vehicle 500. However, in another embodiment, the source resonator coil 502 may be embedded within a front windshield, a side window, or any other non-conducting material of the vehicle 500.

A battery 506 is a power source, such as power source 110 in FIG. 1 and power source 214 in FIG. 2. The battery 506 provides an electric current to the source resonator coil 502 embedded within the windshield 504 of the vehicle 500. The source resonator coil 502 generates oscillating magnetic fields 508 and 510 when the source resonator coil 502 receives the electric current from the battery 506.

The LED deck light 512, LED perimeter lights 514, and LED perimeter lights 516 are wireless auxiliary light devices, such as wireless LED light device 126 in FIG. 1 and wireless emergency vehicle light device 222 in FIG. 2. LED deck light 512, LED perimeter lights 514, and LED perimeter lights 516 each include at least one receiving resonator coil embedded within it, such as receiving resonator coil 128 in FIG. 1 and receiving resonator coils 226 and 232 in FIG. 2.

The LED deck light 512 is mounted within the vehicle in proximity to the back windshield 502. The LED perimeter lights 514 are mounted on the exterior of the vehicle 500 in proximity to the rear driver's side 515 of the vehicle 500. The LED perimeter lights 516, in this non-limiting example, are mounted in proximity to the rear passenger's side 517 of the vehicle 500.

In this embodiment, LED deck light 512 is not within range of the oscillating magnetic fields 508 and 510. However, the LED perimeter lights 514 are within range of oscillating magnetic field 510. The receiving resonator coil embedded within the LED perimeter lights 514 generates an alternating current of electricity to wirelessly power the LED perimeter lights 514 in the presence of the oscillating magnetic field 510.

Likewise, the LED perimeter lights 516 are within range of the oscillating magnetic field 508. The receiving resonator coil embedded within the LED perimeter lights 516 generates an alternating current of electricity to wirelessly power the LED perimeter lights 516 in the presence of the oscillating magnetic field 508.

Figure 6:
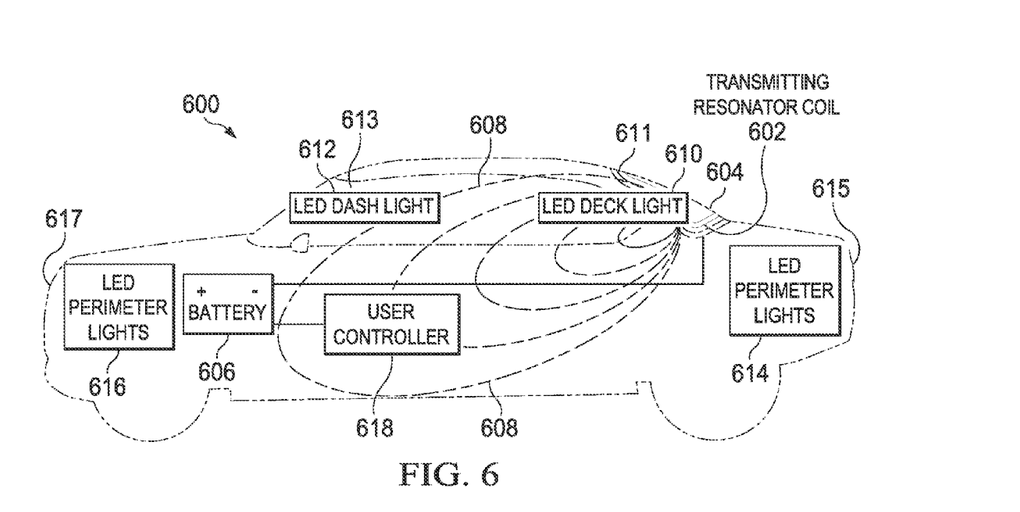
FIG. 6 is an illustration of a side view of a vehicle having a transmitting power module embedded in a windshield in accordance with an illustrative embodiment.

FIG. 6 is an illustration of a side view of a vehicle having a transmitting power module embedded in a windshield in accordance with an illustrative embodiment. Vehicle 600 is a vehicle that includes a resonating power transfer system, such as vehicle resonating power transfer system 100 in FIG. 1 or resonating power transfer system 200 in FIG. 2.

In this example, the vehicle 600 is an automobile. However, vehicle 600 may also be implemented as a truck, van, ambulance, sport utility vehicle (SUV), fire truck, construction vehicle, tow truck, or any other type of vehicle.

A source resonator coil 602 is embedded within a windshield 604 of the vehicle 600. In one embodiment, the source resonator coil 602 may be embedded between two sheets of glass forming the windshield 604. In another embodiment, the source resonator coil 602 may be embedded between a sheet of plastic and a sheet of glass forming the windshield 604. In still another embodiment, the source resonator coil 602 may be attached to an exterior surface of the windshield 604.

In this example, the windshield 604 is a back windshield of the vehicle 600. However, in another embodiment, the source resonator coil 602 may be embedded within a front windshield, a side window, or any other non-conducting material of the vehicle 600.

In response to receiving power from a battery 606, the receiving resonator coil 602 within the windshield 604 generates an oscillating magnetic field 608. The battery in this embodiment may be any type of power source, such as, but without limitation, power source 110 in FIG. 1 and power source 214 in FIG. 2.

LED deck light 610, LED dash light 612, LED perimeter lights 614, and LED perimeter lights 616 are wireless auxiliary light devices, such as wireless LED light device 126 in FIG. 1 and wireless emergency vehicle light device 222 in FIG. 2.

The LED deck light 610, LED dash light 612, LED perimeter lights 614, and LED perimeter lights 616 each include at least one receiving resonator coil embedded within it, such as receiving resonator coil 128 in FIG. 1 and receiving resonator coils 226 and 232 in FIG. 2.

In this non-limiting example, LED dash light 610 is mounted on or near a front windshield 613 or front dash of the vehicle 600. The LED deck light 612 is attached on or near a back windshield 611 or back dash of the vehicle 600.

The LED perimeter lights 614 and 416 may include, without limitation, a LED grill light, a LED hideaway light, or any other type of auxiliary vehicle LED light device. In this example, LED perimeter lights 616 are attached to a front grill 617 of the vehicle 600. The LED perimeter lights 614 are attached to an exterior back 615 portion of the vehicle 600.

In this exemplary embodiment, the LED deck light 610 and the LED dash light 612 are within range of the oscillating magnetic field 608. The receiving resonator coil embedded within the LED deck light 610 generates an alternating current of electricity to wirelessly power the LED deck light 610 in the presence of the oscillating magnetic field 608. Likewise, receiving resonator coil embedded within the LED dash light 612 generates an alternating current of electricity to wirelessly power the LED dash light 612 in the presence of the oscillating magnetic field 608.

The user controller 618 is a device for controlling one or more functions of LED dash light 612, LED deck light 610, LED perimeter lights 614, and/or LED perimeter lights 616. The user controller 618 may be implemented as a control device, such as user controller 118 in FIG. 1.

Figure 7:
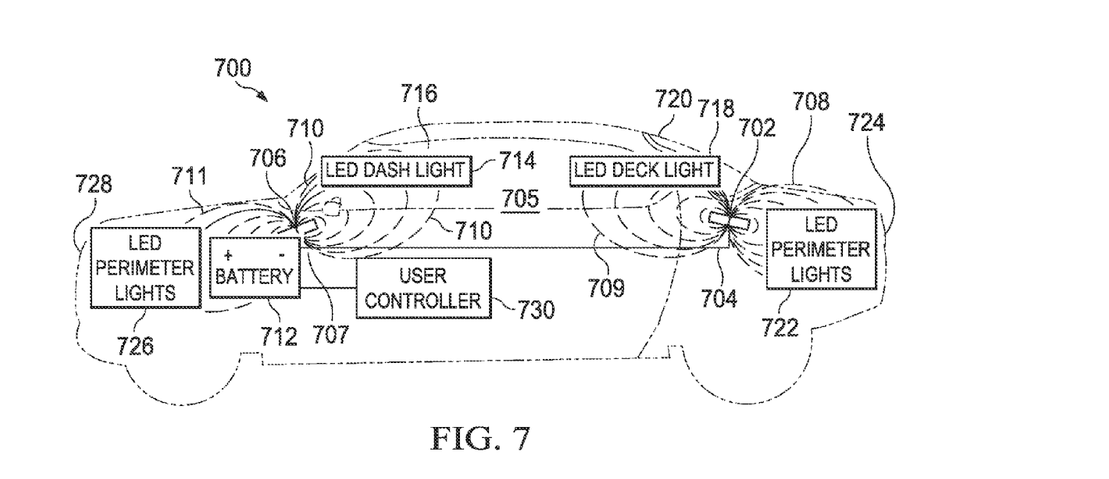
FIG. 7 is an illustration of a side view of a vehicle having a set of transmitting power modules in accordance with an illustrative embodiment.

Referring now to FIG. 7, an illustration of a side view of a vehicle having a set of transmitting power modules is shown in accordance with an illustrative embodiment. Vehicle 700 is a vehicle that includes a resonating power transfer system, such as vehicle resonating power transfer system 100 in FIG. 1 or resonating power transfer system 200 in FIG. 2. Vehicle 700 may be implemented as an automobile, truck, van, ambulance, sport utility vehicle (SUV), fire truck, construction vehicle, tow truck, or any other type of vehicle.

In this exemplary embodiment, a transmitting power module 702 is located at a first location within a passenger compartment 705 of the vehicle 700. In this example, the first location is near a back dash or back windshield 720 of the vehicle 700.

The transmitting power module 702 includes at least one source resonator coil, such as source resonator coil 108 in FIG. 1, first source resonator coil 210 in FIG. 2, and/or second source resonator coil 212 in FIG. 2.

The vehicle 700 also includes a transmitting power module 706 located at a second location 707 within the passenger compartment of the vehicle 700. The transmitting power module 706 includes at least one source resonator coils, such as source resonator coil 108 in FIG. 1, first source resonator coil 210 in FIG. 2, and/or second source resonator coil 212 in FIG. 2.

A battery 712 is connected to the transmitting power modules 702 and 706 via an insulated conductor wire 704. When source resonator coil embedded in transmitting power module 702 receives an electric current from the battery 712 through the insulated conductor wire 704, the source resonator coil generates oscillating magnetic fields 708 and 709. Likewise, when the source resonator coil embedded in transmitting power module 706 receives an electric current, the source resonator coil generates oscillating magnetic fields 710 and 711.

In other words, the transmitting power modules 702 and 706 generate oscillating magnetic fields 708, 709, 710 and 711 when the transmitting power modules 702 and 706 receive an electric current from the battery 712. The battery 712 may be implemented as any type of power source, such as power source 110 in FIG. 1 and power source 214 in FIG. 2.

LED dash light 714, LED deck light 718, LED perimeter lights 722, and LED perimeter lights 726 are wireless light devices, such as wireless LED light device 126 in FIG. 1 and wireless emergency vehicle light device 222 in FIG. 2. The LED dash light 714, LED deck light 718, LED perimeter lights 726, and LED perimeter lights 722 each include at least one receiving resonator coil embedded within it, such as receiving resonator coil 128 in FIG. 1 and receiving resonator coils 226 and 232 in FIG. 2.

In this non-limiting example, the LED dash light 714 is mounted to the dash or other surface within a front 707 portion of the passenger compartment 705 of the vehicle 700. The LED deck light 718 is mounted to a back dash or back windshield 720 of the vehicle 700.

The LED perimeter lights 722 and 726 may be any type of wireless light device having a receiving resonator coil. For example, LED perimeter lights 722 and 726 may be implemented as a LED grill light, a LED hideaway light, a license plate LED light, or any other type of auxiliary vehicle light device. The LED perimeter lights 726 in this non-limiting example are mounted on or near a front bumper 728 of the vehicle 700. The LED perimeter lights 722 are mounted on or near a back bumper 724 of the vehicle 700.

The LED perimeter lights 722 are within range of the oscillating magnetic field 708. In the presence of the oscillating magnetic field 708, a receiving resonator coil within the LED perimeter lights 722 generates an alternating current of electricity to wirelessly power the LED perimeter lights 722.

The LED deck light 718 is within range of the oscillating magnetic field 709. In the presence of the oscillating magnetic field 709, a receiving resonator coil within the LED deck light 824 generates an alternating current of electricity to wirelessly power the LED deck light 824.

LED dash light 714 is within range of the oscillating magnetic field 710. In the presence of the oscillating magnetic field 710, a receiving resonator coil within LED dash light 714 generates an alternating current of electricity to wirelessly power the LED dash light 714.

Likewise, the LED perimeter lights 726 are within range of the oscillating magnetic field 711. A receiving resonator coil embedded within the LED perimeter lights 726 generates an alternating current of electricity in the presence of the oscillating magnetic field 711 to wirelessly power the LED perimeter lights 726.

In this example, a user controller 730 controls one or more control functions of LED dash light 714, LED deck light 718, LED perimeter lights 722, and/or LED perimeter lights 726. The user controller 730 may be implemented as a control device, such as user controller 118 in FIG. 1.

Figure 8:
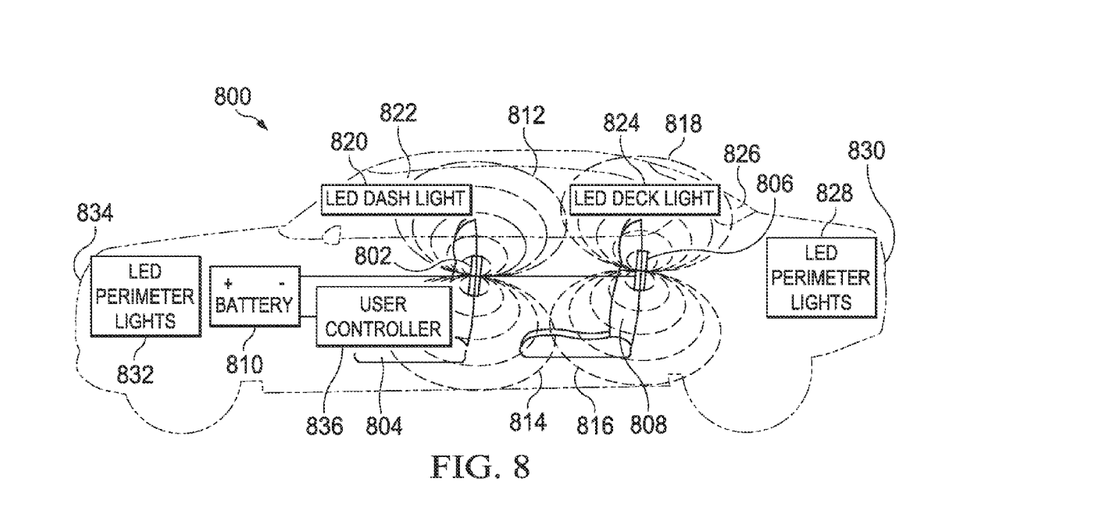
FIG. 8 is another illustration of a side view of a vehicle having a set of transmitting power modules in accordance with an illustrative embodiment.

FIG. 8 is another illustration of a side view of a vehicle having a set of transmitting power modules in accordance with an illustrative embodiment. Vehicle 800 is a vehicle that includes a resonating power transfer system, such as vehicle resonating power transfer system 100 in FIG. 1 or resonating power transfer system 200 in FIG. 2. Vehicle 800 may be implemented as an automobile, truck, van, ambulance, sport utility vehicle (SUV), fire truck, construction vehicle, tow truck, or any other type of vehicle.

In this exemplary embodiment, a transmitting power module 802 is coupled to a driver's seat 804 within the vehicle 800. The transmitting power module 802 in this example is embedded within a seat back. However, in other embodiments, the transmitting power module 802 may be embedded within a head rest, a seat cushion, an arm rest, or any other part of the driver's seat. The transmitting power module 802 includes at least one source resonator coil, such as source resonator coil 108 in FIG. 1, first source resonator coil 210 in FIG. 2, and/or second source resonator coil 212 in FIG. 2.

Another transmitting power module 806 is coupled to a passenger's seat 808 of the vehicle 800. The transmitting power module 806 in this example is also embedded within a seat back of the passenger's seat 808. However, in other embodiments, the transmitting power module 802 may be embedded within a head rest, a seat cushion, an arm rest, or any other part of the passenger's seat.

The transmitting power module 806 includes at least one source resonator coils, such as source resonator coil 108 in FIG. 1, first source resonator coil 210 in FIG. 2, and/or second source resonator coil 212 in FIG. 2. When source resonator coil embedded in transmitting power module 802 receives an electric current from the battery 810, the transmitting power module 802 generates oscillating magnetic fields 812 and 814. Likewise, when the source resonator coil embedded in transmitting power module 806 receives an electric current from the battery 810, the source resonator coil generates oscillating magnetic fields 816 and 818.

In other words, the transmitting power modules 802 and 806 generate oscillating magnetic fields 812, 814, 816, and 818 when the transmitting power modules 802 and 806 receive an electric current from the battery 810. The battery 810 may be any type of power source, such as power source 110 in FIG. 1 and power source 214 in FIG. 2.

LED dash light 820, LED deck light 824, LED perimeter lights 828, and LED perimeter lights 832 are wireless auxiliary vehicle lights, such as wireless LED light device 126 in FIG. 1 and wireless emergency vehicle light device 222 in FIG. 2. LED dash light 820, LED deck light 824, LED perimeter lights 828, and LED perimeter lights 832 each include at least one receiving resonator coil embedded within it, such as receiving resonator coil 128 in FIG. 1 and receiving resonator coils 226 and 232 in FIG. 2.

LED dash light 820 is an emergency vehicle light mounted to a dash or other surface within a front passenger compartment 822 of the vehicle 800. The LED dash light 820 is within range of the oscillating magnetic field 812 generated by the transmitting power module 802 embedded within the driver's seat 804. A receiving resonator coil embedded within the LED dash light 820 generates an alternating current of electricity in the presence of the oscillating magnetic field 812 to wirelessly power the LED dash light 820.

The LED deck light 824 is an emergency vehicle light mounted to a dash or other surface within a back passenger compartment 826 of the vehicle 800. The LED deck light 824 is within range of the oscillating magnetic field 818 generated by the transmitting power module 806 embedded within the passenger's seat 808. A receiving resonator coil embedded within the LED deck light 824 generates an alternating current of electricity in the presence of the oscillating magnetic field 818 to wirelessly power the LED deck light 824.

The LED perimeter lights 828 and 832 may be any type of wireless light device having a receiving resonator coil. For example, LED perimeter lights 828 and 832 may include, without limitation, a LED grill light, a hideaway LED light, license plate LED light, or any other type of auxiliary vehicle light device.

LED perimeter lights 832 is mounted to an exterior front 834 portion of the vehicle 800. LED perimeter lights 828 are mounted to an exterior back 830 portion of the vehicle 800. In this embodiment, LED perimeter lights 828 and 832 are not within range of any oscillating magnetic fields.

In this example, a user controller 836 is a device that controls one or more functions of LED dash light 820, LED deck light 824, LED perimeter lights 828, and/or LED perimeter lights 832 in response to receiving a user input. The user controller 836 may be implemented as a control device, such as user controller 118 in FIG. 1.

Figure 9:
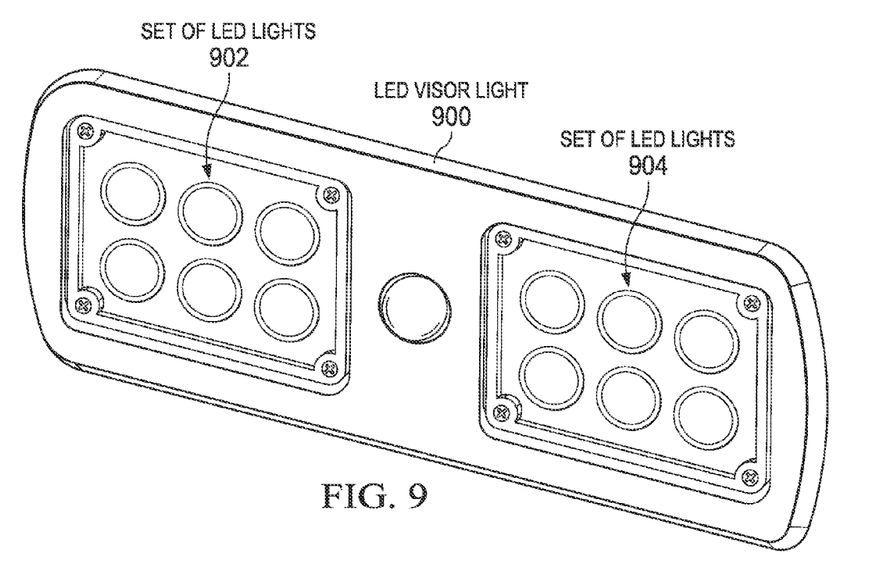
FIG. 9 is an illustration of a LED visor light in accordance with an illustrative embodiment.

Turning now to FIG. 9, an illustration of a visor light is depicted in accordance with an illustrative embodiment. LED visor light 900 is a wireless auxiliary vehicle light device, such as wireless LED light device 126 in FIG. 1 and wireless emergency vehicle light device 222 in FIG. 2. The LED visor light 900 is mounted to a visor within a passenger compartment of a vehicle, such as vehicle 202 in FIG. 2, vehicle 300 in FIG. 3, vehicle 400 in FIG. 4, vehicle 500 in FIG. 5, vehicle 600 in FIG. 6, vehicle 700 in FIG. 7, or vehicle 800 in FIG. 8.

The LED visor light 900 includes a set of LED lights 902 and a set of LED lights 904. The set of LED lights 902 and 904 are lights, such as, but without limitation, set of LED lights 138 in FIG. 1, first set of LED lights 230 in FIG. 2, and second set of LED lights 236 in FIG. 2.

In this non-limiting example, the set of LED lights 902 are blue lights and the set of LED lights 904 are red lights. However, the embodiments are not limited to red and blue lights. In another embodiment, the set of LED lights 902 and 904 may include white lights, yellow lights, or any other color lights.

The LED visor light 900 receives wireless power via a resonant power transfer system, such as, but without limitation, resonant power transfer system 100 in FIG. 1 and resonant power transfer system 200 in FIG. 2.

Figure 10:
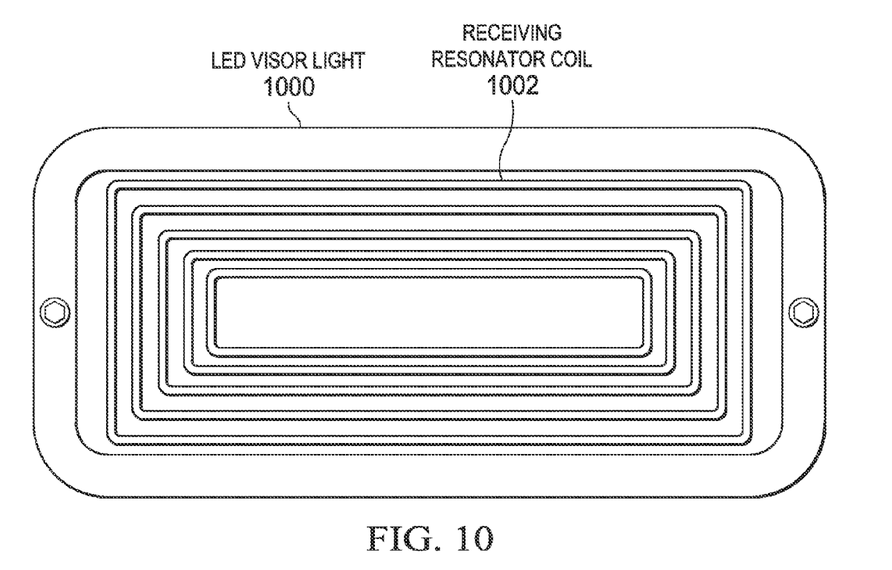
FIG. 10 is an illustration of a receiving induction coil embedded within a LED visor light in accordance with an illustrative embodiment.

FIG. 10 is an illustration of a receiving induction coil embedded within a visor light in accordance with an illustrative embodiment. FIG. 10 shows a cross section of a LED visor light 1000. The LED visor light 1000 is a wireless visor light, such as LED visor light 900 in FIG. 9. The LED visor light 1000 includes LED lights, such as, but without limitation, set of LED lights 902 and 904.

The LED visor light 1000 is a light device that receives power via a vehicle resonant power induction system, such as wireless LED light device 126 in FIG. 1 and wireless emergency vehicle light device 222 in FIG. 2.

The LED visor light 1000 includes a receiving resonator coil 1002 embedded within the LED visor light 1000. The receiving resonator coil 1002 is a loop or coil made of a conducting material. The receiving resonator coil 1002 is a resonating induction coil, such as receiving resonator coil 128 in FIG. 1, first receiving resonator coil 226 in FIG. 2, and second receiving resonator coil 232 in FIG. 2.

When the receiving resonator coil 1002 comes within range of an oscillating magnetic field, the receiving induction coil 1002 generates an alternating electric current that powers the set of LED lights within the LED visor light 1002. In this manner, the LED visor light 1000 receives wireless power via a resonant induction power transfer system in accordance with the illustrative embodiments.

Figure 11:
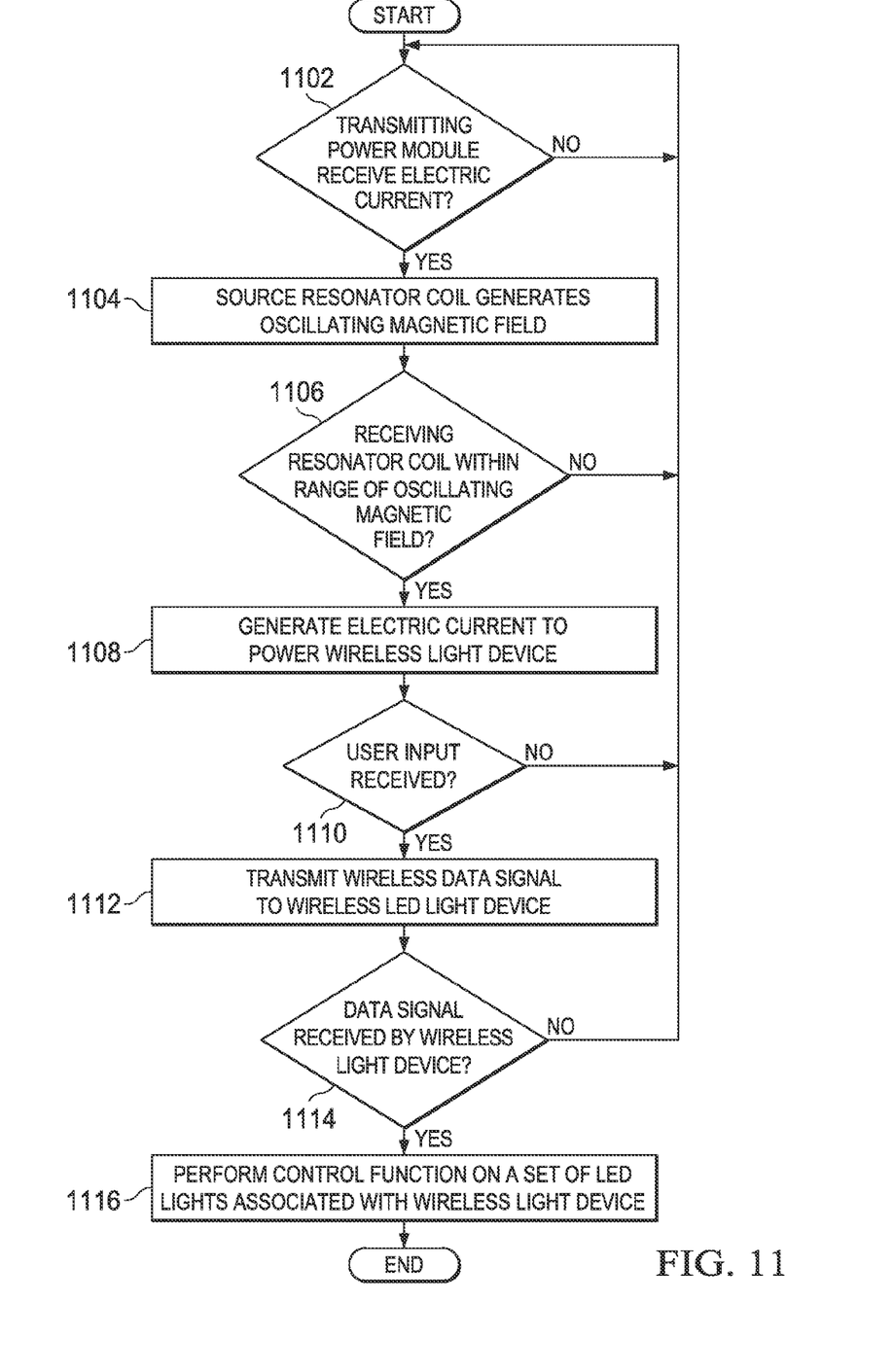
FIG. 11 is a flowchart illustrating a process for resonating power transfer to a wireless vehicle LED light device in accordance with an illustrative embodiment.

Referring now to FIG. 11, a flowchart of a process for resonating power transfer to a wireless vehicle light device is depicted in accordance with an illustrative embodiment. The process in FIG. 11 is implemented by a resonating power transfer system, such as resonating power transfer system 100 in FIG. 1 and vehicle induction power transfer system 100 in FIG. 1 and resonating power transfer system 200 in FIG. 2.

The process begins by making a determination as to whether a transmitting power module is receiving an electric current (step 1102). If an electric current is not received, the process returns to step 1102.

If an electric current is received by the transmitting power module at step 1102, a source resonator coil associated with the transmitting power module generates an oscillating magnetic field (step 1104).

The process makes a determination as to whether a receiving resonator coil is within range of the oscillating magnetic field (step 1106). If no, the process returns to step 1102.

If the receiving resonator coil is within range of the oscillating magnetic field at step 1106, the receiving resonator coil generates an electric current to power a wireless LED light device associated with the receiving resonator coil (step 1108). In this embodiment, the receiving resonator coil is embedded within the wireless light device.

The process makes a determination as to whether a user input is received (step 1110). If no, the process returns to step 1102. If a user input is received at step 1110, a wireless communication transmitter transmits the wireless data signal to a wireless light device (step 1112). An LED controller performs a control function on a set of LED lights associated with the wireless light device (step 1116) with the process terminating thereafter.

In one embodiment, the electric current generated by the receiving resonator coil in step 1108 is an alternating current of electricity. In this embodiment, a receiving power module converts the alternating current of electricity to direct current electricity to power the wireless LED light device.

In some alternative implementations, the functions noted in the steps of the flowchart shown in FIG. 11 may occur out of the order noted in FIG. 11. For example, two steps shown in succession may, in fact, be executed substantially concurrently, or the steps may sometimes be executed in the reverse order, depending upon the functionality involved.

The illustrative embodiments provide a method, system, and apparatus for wirelessly providing power to auxiliary vehicle light devices using resonating induction power transfer associated with a vehicle. The embodiments overcome the problem caused by electrical cords and wires supplying power to auxiliary lights on a vehicle.

Powering auxiliary LED lights using the resonating power transfer system of the embodiments enables a user to install auxiliary LED lights on a vehicle without drilling any holes in an interior or exterior of the vehicle to accommodate electrical wiring to the battery or other power source, such as a cigarette lighter. Instead, the embodiments include one or more receiving resonator coils within an auxiliary LED light to wirelessly power the auxiliary LED vehicle light. In this manner, the embodiments minimize or avoid creation of undesirable holes and other permanent modifications to the vehicle body and roof.

Likewise, the resonating power transfer system of the embodiments minimizes or avoids the need to disassemble multiple parts of the vehicle interior and exterior to accommodate electrical wiring from the auxiliary light device to the battery or other power source. Thus, the embodiments make auxiliary light device installation less time consuming, simpler, and more efficient. The embodiments also improve the aesthetics and appearance of the auxiliary lights by removing the need for unsightly electrical cords within running through the passenger compartment and other areas of the vehicle.

The flowchart and block diagrams in the figures illustrate the architecture, functionality, and operation of possible implementations of the resonating power transfer system according to various embodiments. The detailed description of the illustrative embodiments above is described in sufficient detail to enable those skilled in the art to practice the invention. To avoid unnecessary detail, the description may have omitted certain information known to those skilled in the art.

Although the illustrative embodiments described herein have been disclosed in the context of certain illustrative, non-limiting embodiments, it should be understood that various changes, substitutions, permutations, and alterations can be made without departing from the scope of the invention as defined by the appended claims. Any feature that is described in connection to any one embodiment may also be applicable to any other embodiment. It is also understood that other embodiments may be utilized and that logical structural, mechanical, and chemical changes may be made without departing from the spirit or scope of the invention.

What is claimed is:

1. A vehicle resonating power transfer system for wireless LED vehicle lights, the resonating power transfer system comprising:
    a transmitting power module comprising:
        a resonator control board; and
        an oscillating electric circuit;
    a source resonator coil;
    a power source connected to the transmitting power module, wherein the power source supplies a direct electric current to the transmitting power module, and wherein the resonator control board and oscillating electric circuit converts the direct electric current into an alternating electric current;

an oscillating magnetic field generated by the source resonator coil responsive to the source resonator coil receiving the alternating electric current;

a user controller comprising a wireless communication transmitter adapted to transmit a wireless data signal to a wireless communication receiver; and a wireless LED light device, the wireless LED light device comprising:

a receiving resonator coil, wherein the receiving resonator coil generates an alternating electric current in a presence of the oscillating magnetic field;

a set of LED lights associated with the wireless LED light device, wherein the alternating electric current generated by the receiving resonator coil powers the set of LED lights;

the wireless communication receiver adapted to receive the wireless data signal from the wireless communication transmitter associated with the user controller; and an LED controller, wherein the LED controller performs a control function on the set of lights in response to receiving the data signal.

2. The vehicle resonating power transfer system of claim 1, wherein the wireless vehicle light is a wireless emergency light associated with an emergency vehicle, wherein the wireless emergency light is a LED dash light, a LED visor light, an interior LED light bar, an exterior LED light bar, a license plate LED warning light, a LED grill light, a hideaway LED light, a LED beacon, a LED vehicle flasher, a warning LED light, or a deck LED light.

3. The vehicle resonating power transfer system of claim 1, wherein the control function comprises at least one of activating the set of LED lights, deactivating the set of LED lights, changing a strobe pattern of the set of LED lights, changing a luminosity of the set of LED lights, changing a frequency of flashing of the set of LED lights, and changing a color pattern of the set of LED lights.

4. The vehicle resonating power transfer system of claim 1, further comprising:

a first transmitting power module coupled to the vehicle at a first location within a passenger compartment of the vehicle; and a second transmitting power module coupled to the vehicle at a second location within the passenger compartment of the vehicle, wherein the oscillating magnetic field comprises:

a first oscillating magnetic field generated by the first transmitting power module; and a second oscillating magnetic field generated by the second transmitting power module.

5. The vehicle resonating power transfer system of claim 1, further comprising:

a first wireless LED light device coupled to the vehicle at a first location, wherein the first wireless LED light device comprises a first receiving resonator coil, wherein the first receiving resonator coil generates an alternating electric current to power a first set of LED lights within the first wireless emergency vehicle light device in response to a presence of the oscillating magnetic field; and a second wireless LED light device coupled to the vehicle at a second location, wherein the second wireless LED light device comprises a second receiving resonator coil, wherein the second receiving resonator coil generates an alternating electric current to power a second set of LED lights within the second wireless emergency vehicle light device in response to a presence of the oscillating magnetic field.

6. A vehicle resonating power transfer system for wireless emergency vehicle lights, the resonating power transfer system comprising:

a set of transmitting power modules associated with a vehicle, the set of transmitting power modules further comprising:

a first transmitting power module comprising a first source resonator coil; and a second transmitting power module comprising a second source resonator coil;

a power source connected to the set of transmitting power modules, wherein the power source supplies a direct electric current to the each transmitting power module in the set of transmitting power modules;

an oscillating magnetic field generated by the first source resonator coil and the second source resonator coil in the set of transmitting power modules responsive to the set of transmitting power modules receiving the electric current from the power source; and a wireless emergency vehicle light device associated with the vehicle, the wireless emergency vehicle light device further comprising:

a set of LED lights; and a receiving resonator coil embedded within the wireless emergency vehicle light device, wherein the receiving resonator coil generates an alternating electric current to power the set of LED lights within the wireless vehicle light device in response to a presence of the oscillating magnetic field.

7. The vehicle resonating power transfer system of claim 6, further comprising:

the first transmitting power module coupled to the vehicle at a first location within a passenger compartment of the vehicle; and the second transmitting power module coupled to the vehicle at a second location within the passenger compartment of the vehicle, wherein the oscillating magnetic field comprises:

a first oscillating magnetic field generated by the first transmitting power module; and a second oscillating magnetic field generated by the second transmitting power module, wherein the receiving resonator coil generates the alternating electric current to power the set of LED lights in response to a presence of the first oscillating magnetic field or a presence of the second oscillating magnetic field within a range of the receiving resonator coil.

8. The vehicle resonating power transfer system of claim 6, further comprising:

a front dash within a passenger compartment of the vehicle, wherein a transmitting power module in the set of transmitting power modules is coupled to the front dash.

9. The vehicle resonating power transfer system of claim 6, further comprising:

a back dash within a passenger compartment of the vehicle, wherein a transmitting power module in the set of transmitting power modules is coupled to the back dash.

10. The resonating power transfer system of claim 6, further comprising:

a headliner within the passenger compartment of the vehicle, wherein a transmitting power module in the set of transmitting power modules is coupled to the headliner.

11. The vehicle resonating power transfer system of claim 6, further comprising:
   a seat within the passenger compartment of the vehicle, wherein a transmitting power module in the set of transmitting power modules is associated with the seat.

12. The vehicle resonating power transfer system of claim 6, further comprising:
   a door of the vehicle, wherein a transmitting power module in the set of transmitting power modules is embedded within the door of the vehicle.

13. The resonating power transfer system of claim 6, further comprising:
   a windshield of the vehicle, wherein a source resonator coil in the plurality of transmitting coils is embedded within a portion of the windshield.

14. The vehicle resonating power transfer system of claim 6, further comprising:
   a set of wireless emergency vehicle lights associated with the vehicle, wherein the wireless emergency vehicle light device is a first wireless emergency vehicle light device, and further comprising:
   a second wireless emergency vehicle light device in the set of wireless emergency vehicle light devices, wherein a second receiving resonator coil is embedded within the second wireless LED light device, and wherein the second receiving resonator coil generates an alternating electric current to power a set of LED lights within the second wireless emergency vehicle light device in response to a presence of the oscillating magnetic field.

15. The vehicle resonating power transfer system of claim 6, further comprising:
   a user controller within an interior of the vehicle, the user controller further comprising:
      a wireless communication transmitter configured to transmit a wireless data signal to the wireless LED light device;
      a wireless communication receiver embedded within the wireless emergency vehicle light device and adapted to receive the wireless data signal from the wireless communication transmitter; and
      an LED controller associated with the wireless emergency vehicle light device, wherein the LED controller performs a control function with respect to the set of LED lights in response to receiving the wireless data signal from the user controller.

16. The vehicle resonating power transfer system of claim 15, wherein the control function comprises at least one of activating the set of LED lights, deactivating the set of LED lights, changing a strobe pattern of the set of LED lights, changing a luminosity of the set of LED lights, and changing a color pattern of the set of LED lights.

17. A method for resonating power transfer to an emergency vehicle wireless LED light device, the method comprising:
   responsive to receiving an electric current by a transmitting power module associated with a vehicle, generating an oscillating magnetic field by a source resonator coil associated with the transmitting power module;
   responsive to a presence of the oscillating magnetic field within a range of a receiving resonator coil embedded within a wireless LED light device, generating an alternating electric current by the receiving resonator coil to power wireless LED light device, wherein the wireless LED light device comprises a set of LED lights;
   responsive to receiving a user input by a user controller, transmitting a data signal by a wireless communication transmitter to the wireless LED light device; and
   responsive to receiving the data signal by a wireless communication receiver associated with the light device, performing a control function on the set of LED lights, by an LED controller.

18. The method of claim 17, wherein performing a control function on the set of LED lights further comprises activating the set of LED lights or deactivating the set of LED lights.

19. The method of claim 17, wherein performing a control function on the set of LED lights further comprises changing a strobe pattern of the set of LED lights, changing a luminosity of the set of LED lights, dimming the set of LED lights, changing a frequency of flashing of the set of LED lights, or changing a color pattern of the set of LED lights.

20. The method of claim 17, further comprising:
   syncing a first pairing switch associated with the wireless communication transmitter within the user controller with a second pairing switch associated with the wireless communication receiver embedded within the wireless LED light device.

* * * * *